(12) United States Patent
Grammel et al.

(10) Patent No.: US 11,683,331 B2
(45) Date of Patent: Jun. 20, 2023

(54) TRUST SCORING OF NETWORK ENTITIES IN NETWORKS

(71) Applicant: Juniper Networks, Inc., Sunnyvale, CA (US)

(72) Inventors: Gert Grammel, Ditzingen (DE); Kieran Gerard McPeake, Belfast (GB); Kieran Dalton, Lisburn (GB)

(73) Assignee: Juniper Networks, Inc., Sunnyvale, CA (US)

( * ) Notice: Subject to any disclaimer, the term of this patent is extended or adjusted under 35 U.S.C. 154(b) by 205 days.

(21) Appl. No.: 16/949,996

(22) Filed: Nov. 23, 2020

(65) Prior Publication Data
US 2022/0166788 A1    May 26, 2022

(51) Int. Cl.
*H04L 9/40*    (2022.01)

(52) U.S. Cl.
CPC ...... *H04L 63/1433* (2013.01); *H04L 63/1425* (2013.01)

(58) Field of Classification Search
CPC ............. H04L 63/1433; H04L 63/1425; G06F 21/552
See application file for complete search history.

(56) References Cited

U.S. PATENT DOCUMENTS

| | | | |
|---|---|---|---|
| 9,363,283 B1* | 6/2016 | Herrera-Yagüe | G06F 21/57 |
| 10,432,605 B1* | 10/2019 | Lester | G06F 21/552 |
| 10,855,619 B1* | 12/2020 | Andrews | H04L 63/20 |
| 10,958,673 B1* | 3/2021 | Chen | H04L 63/1466 |
| 2009/0100504 A1* | 4/2009 | Conner, II | G06F 21/554 726/3 |
| 2011/0280160 A1 | 11/2011 | Yang | |
| 2013/0298192 A1 | 11/2013 | Kumar et al. | |
| 2015/0074390 A1* | 3/2015 | Stoback | H04L 63/1483 713/156 |
| 2015/0156208 A1 | 6/2015 | Kirkham et al. | |
| 2015/0180903 A1 | 6/2015 | Cooper et al. | |
| 2016/0373486 A1* | 12/2016 | Kraemer | H04L 63/1441 |
| 2017/0171231 A1* | 6/2017 | Reybok, Jr. | H04L 63/0428 |
| 2018/0075563 A1* | 3/2018 | Ananthanpillai | G06F 21/552 |
| 2018/0091453 A1* | 3/2018 | Jakobsson | H04L 63/1441 |
| 2019/0207954 A1* | 7/2019 | Ahuja | H04L 63/1441 |

(Continued)

FOREIGN PATENT DOCUMENTS

| | | |
|---|---|---|
| EP | 1832059 A1 | 9/2007 |
| EP | 3343864 A1 | 7/2018 |

(Continued)

OTHER PUBLICATIONS

"Overview of Risks Introduced by 5G Adoption in the United States," Critical Infrastructure Security and Resilience Note, Cybersecurity and Infrastructure Security Agency, Jul. 31, 2019, 16 pp.

(Continued)

*Primary Examiner* — Sarah Su
(74) *Attorney, Agent, or Firm* — Shumaker & Sieffert, P.A.

(57) ABSTRACT

A method to determine, by a computing system, a trust score for a network entity in a computer network, the trust score for the network entity indicating a level of trust in the network entity; and modifying, by the computing system, a traffic pattern of the computer network based on the trust score for the network entity.

21 Claims, 6 Drawing Sheets

(56) References Cited

U.S. PATENT DOCUMENTS

| | | | |
|---|---|---|---|
| 2019/0268366 A1* | 8/2019 | Zeng | G06N 3/0472 |
| 2020/0012796 A1* | 1/2020 | Trepagnier | G06K 9/6218 |
| 2020/0067935 A1* | 2/2020 | Carnes, III | H04L 63/101 |
| 2020/0356676 A1 | 11/2020 | Gorlamandala | |
| 2021/0029152 A1 | 1/2021 | Charles et al. | |
| 2022/0043913 A1* | 2/2022 | Keith, Jr. | G06F 21/43 |

FOREIGN PATENT DOCUMENTS

| | | | | |
|---|---|---|---|---|
| EP | 4002795 A1 * | 5/2022 | | H04L 63/1425 |
| WO | 2006070172 A1 | 7/2006 | | |
| WO | WO-2006094275 A2 * | 9/2006 | | G06F 21/55 |

OTHER PUBLICATIONS

"Cybersecurity of 5G networks EU Toolbox of risk mitigating measures," NIS Cooperation Group, CG Publication, Jan. 2020, 45 pp.

"Time Guidance for Network Operators, Chief Information Officers, and Chief Information Security Officers," Cybersecurity and Infrastructure Security Agency, Jun. 2020, 18 pp.

Conran, "Zero Trust Networking (ZIN): don't trust anything," The Network Architect, Sep. 18, 2018, 7 pp.

Extended Search Report from counterpart European Application No. 21156376.2, dated Jun. 25, 2021, 6 pp.

U.S. Appl. No. 17/474,871, filed Sep. 14, 2021, naming inventors O'Neill et al.

Response to Extended Search Report dated Jun. 25, 2021, from counterpart European Application No. 21156376.2 filed Nov. 22, 2022, 13 pp.

\* cited by examiner

| | Event | | 0 | 1 | Re-set 2 | 3 | Re-set 4 | 5 | Re-set 6 | Re-boot 7 | 8 | 9 |
|---|---|---|---|---|---|---|---|---|---|---|---|---|
| Prerequisites | Date | | | | | | | | | | | |
| | Certified software release? | | ✓ | ✓ | ✓ | ✓ | ✓ | ✓ | ✓ | ✓ | ✓ | ✓ |
| | Certified hardware release? | | ✓ | ✓ | ✓ | ✓ | ✓ | ✓ | ✓ | ✓ | ✓ | ✓ |
| | All prerequisites met? | | ✓ | ✓ | ✓ | ✓ | ✓ | ✓ | ✓ | ✓ | ✓ | ✓ |
| Variable factor | Software | Appr. | Appr. | Appr. | Appr. | Appr. | Appr. | Appr. | Appr. | Appr. | Appr. |
| | Is a known-good release? | | ✓ | ✓ | ✓ | ✓ | ✓ | ✓ | ✓ | ✓ | ✓ | ✓ |
| | SW version ≤ last-3 | | ✓ | ✓ | ✓ | ✓ | ✓ | ✓ | ✓ | ✓ | ✓ | ✓ |
| | Weighted subtotal | | 60 | 60 | 60 | 60 | 60 | 60 | 60 | 60 | 60 | 60 |
| Reputation | Reputation per period without reset | | 0 | 1 | 0 | 1 | 0 | 1 | 0 | 1 | 2 | 3 |
| | Reputation per period without reboot | | 0 | 1 | 2 | 3 | 4 | 5 | 6 | 0 | 1 | 2 |
| | Weighted subtotal | | 0 | 8 | 12 | 20 | 24 | 32 | 30 | 2 | 10 | 18 |
| | Total Trust (%) | | 60 | 68 | 72 | 80 | 84 | 92 | 90 | 62 | 70 | 78 |

TRUST SCORING OF NETWORK ENTITIES IN NETWORKS

TECHNICAL FIELD

The disclosure relates to security in computer networks.

BACKGROUND

Zero-trust networking is an approach to network security in which network administrators assume that network entities should not be trusted by default, even if those network entities are in a private network or previously verified. Example types of network entities may include network nodes (e.g., endpoint devices, intermediate network devices, etc.), network services, or other types of real or virtual entities that can be identified on a computer network. Because network entities are not trusted by default in zero-trust networking, identity and integrity checks are routinely performed on network entities, even if such entities are part of a private computer network.

SUMMARY

In general, the disclosure describes techniques for cybersecurity in computer networks. As described in this disclosure, a computing system determines trust scores for network entities in a computer network. The trust score for a network entity indicates a level of trust in the network entity. The computing system may perform various actions based on the trust scores of the network entities. For instance, in some examples, the computing system may modify traffic patterns in the computer network based on the trust scores.

In one example, a method includes determining, by a computing system, a trust score for a network entity in a computer network, the trust score for the network entity indicating a level of trust in the network entity; and modifying, by the computing system, a traffic pattern of the computer network based on the trust score for the network entity.

In another example, a computing system includes one or more processors comprising processing circuitry configured to: determining, by a computing system, a trust score for a network entity in a computer network, the trust score for the network entity indicating a level of trust in the network entity; and modifying, by the computing system, a traffic pattern of the computer network based on the trust score for the network entity; and one or more storage devices configured to store the trust score for the network entity.

In another example, a computer-readable storage medium comprises instructions that, when executed, cause one or more programmable processors to: determine a trust score for a network entity in a computer network, the trust score for the network entity indicating a level of trust in the network entity; and modify a traffic pattern of the computer network based on the trust score for the network entity.

The details of one or more examples are set forth in the accompanying drawings and the description below. Other features, objects, and advantages will be apparent from the description and drawings, and from the claims.

DETAILED DESCRIPTION

Figure 1:
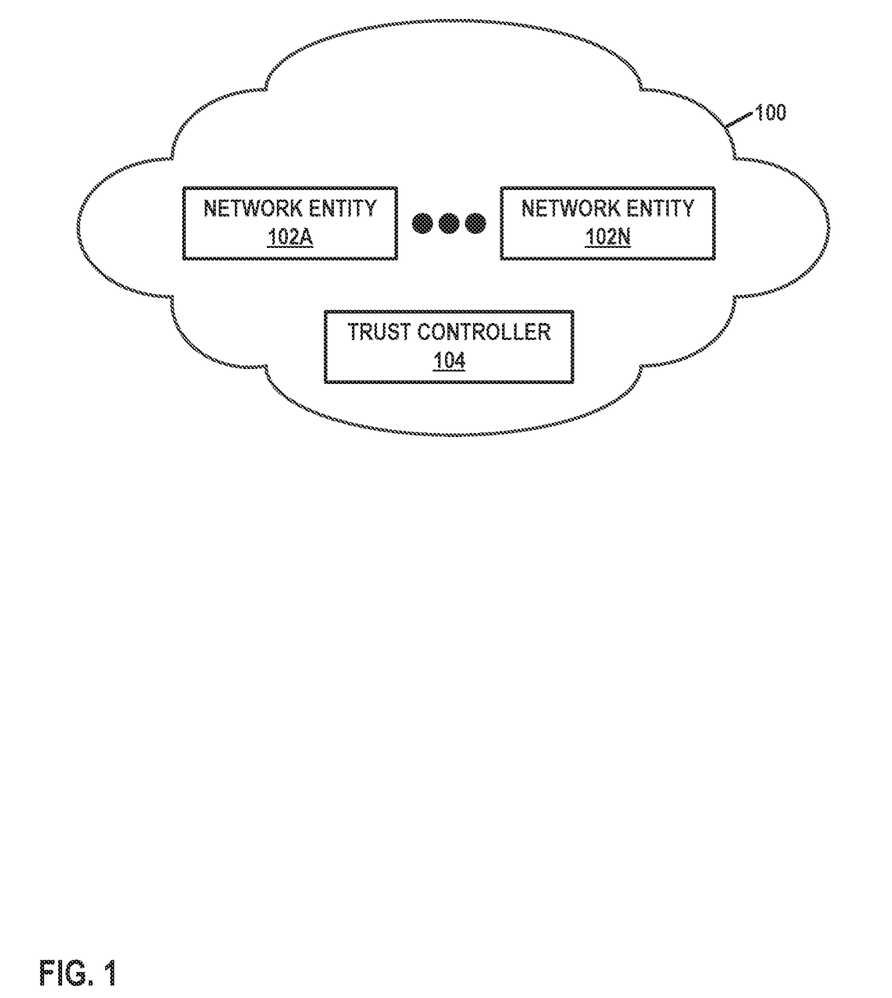
FIG. 1 is a block diagram illustrating an example computer network in accordance with one or more techniques of this disclosure.

FIG. 1 is a block diagram illustrating an example computer network 100 in accordance with one or more techniques of this disclosure. Computer network 100 may include various types of computer networks, such as private networks (e.g., internal corporate or government networks), virtual private networks, residential networks, etc.) or public networks (e.g., cellular communication networks, Internet backbone networks, etc.).

In the example of FIG. 1, computer network 100 includes a set of network entities 102A through 102N, where N corresponds to an arbitrary number. This disclosure may refer to network entities 102A through 102N collectively as "network entities 102". In general, each of network entities 102 is individually addressable within computer network 100 and can send and receive data on computer network 100. One or more of network entities 102 may be computing nodes, such as real or virtual endpoint devices (e.g., personal computers, smartphones, tablet computers, server devices, laptop computers, Internet of Things (IoT) devices, wearable devices, etc.) or real or virtual intermediate devices (e.g., routers, switches, firewall devices, virtualized appliances, etc.). In some examples, one or more of network entities 102 may be network services, such as web servers, certain application programming interfaces (APIs), media streaming services, and so on. Other types of network entities may include components, controllers, and routes through computer network 100.

As mentioned above, computer networks such as computer network 100 may be designed to operate using a zero-trust networking architecture. When a computer network operates using a zero-trust networking architecture, numerous authentication and security checks are performed (e.g., each time a service is requested from a network entity in the computer network). Performing such checks may be resource intensive and may increase network latency. Accordingly, to increase network performance in computer networks that operate using zero-trust networking architectures, network administrators may reduce the intensity of checks with respect to specific network entities on an ad hoc basis. While doing so may increase network performance, doing so may undermine the overall security of the computer network because there is no systematic methodology for reducing the intensity of checks with respect to individual network entities. Rather, such reductions in the intensity of checks may be based on a network administrator's experience and intuition. This may lead to inconsistencies and misconfigurations in the computer network, e.g., because knowledge of the reductions in the intensity of checks may not be transferred between network administrators. Ultimately, this may lead to adverse outcomes, such as security breaches and network outages.

This disclosure describes techniques that may address one or more of these issues. For instance, as shown in the example of FIG. 1, computer network 100 includes a trust controller 104. Trust controller 104 is a computing system that comprises one or more computing devices, such as one or more server devices, personal computing devices, or other types of computing devices. Trust controller 104 determines trust scores for network entities 102 in computer network 100. Additionally, trust controller 104 may use the trust scores for network entities 102 to perform various actions with respect to computer network 100. In some examples, a computing system other than trust controller 104 uses the trust scores for network entities 102 to perform action with respect to computer network 100. However, for ease of explanation, this disclosure describes trust controller 104 as performing the actions. Because trust controller 104 determines the trust scores in a predictable, reproducible way, the trust scores may be applied consistently throughout network entities of computer network 100. Thus, inconsistencies associated with ad hoc adjustments to checking may be reduced and there may be less need for documentation to pass knowledge of security procedures between network administrators. Trust controller 104 may be implemented as a single trust controller or as (or within) a system (e.g., a hierarchy) of two or more trust controllers. In examples where trust controller 104 is implemented as a system of trust controllers, the trust controllers of trust controller 104 may correspond to specific classes of network entities, different network entities in sub-networks of computer network 100, or other groupings of network entities.

As mentioned above, trust controller 104 determines trust scores for network entities 102. The trust score for a network entity indicates a level of trust in the network entity. In general, there is greater trust in a network entity if the network entity has previously performed in a manner that is desired by administrators of computer network 100. Conversely, there is less trust in a network entity if the network entity has not performed in a manner that is desired by administrators of computer network 100. For example, the trust score for a network entity may indicate low trust if the network entity is known to be compromised by malware, if the network entity is known to generate corrupted data, if the network entity is known to have frequent service outages, if the network entity has known unpatched security flaws, and so on.

Trust controller 104 may determine a trust score for a network entity based on several factors. For instance, trust controller 104 may determine a trust score for a network entity based on one or more contribution classes. The contribution classes are classes of information that contribute to the trust score for a network entity. In some examples, the contribution classes include one or more of a set of prerequisites for the network entity, a set of variable factors for the network entity, and/or a set of reputation factors for the network entity.

In some examples, there may be a separate sub-score for each of the contribution classes. For instance, there may be a first sub-score for the prerequisites for the network entity, a second sub-score for the variable factors for the network entity, and a third sub-score for the reputation factors for the network entity. In some examples, the sub-score for a contribution class is expressed as a percentage of a highest possible sub-score for the contribution class. In other examples, sub-score for contribution classes are expressed in other ways. Trust controller 104 may use the sub-scores for the contribution classes (e.g., the first, second, and third sub-scores) for the network entity to determine the trust score for the network entity. Thus, the trust score for the network entity may be the result of a mathematic computation that is based on one or more of the prerequisites for the network entity, the variable factors for the network entity, and/or the reputation factors for the network entity.

Each of the prerequisites for the network entity is a condition that must be satisfied for the trust score for the network entity to have a value greater than a minimum value (e.g., 0). In this disclosure, a trust score for a network entity having the minimum value means that a lowest trust level (e.g., no trust) is afforded to the network entity. In some examples, the minimum value may be equal to 0. However, values other than 0 may be used to represent a trust score indicating no trust.

The variable factors for a network entity correspond to current characteristics of the network entity. Example characteristics of a network entity may include a current configuration of the network entity, a version of the network entity, active features of the network entity, and so on. The variable factors may be weighted such that some of the variable factors contribute more to the variable factors sub-score than other ones of the variable factors.

Each of the reputation factors for a network entity may be a function of specified historical events involving the network entity. For example, trust controller 104 modifies the values of reputational factors for a network entity based on behavior of the network entity over time. For example, trust controller 104 may modify the value of one reputation factor based on the number of times that the network entity spontaneously reboots. In another example, trust controller 104 may modify the value of a reputation factor based on the number of times the network entity has been reconfigured.

Figure 2:
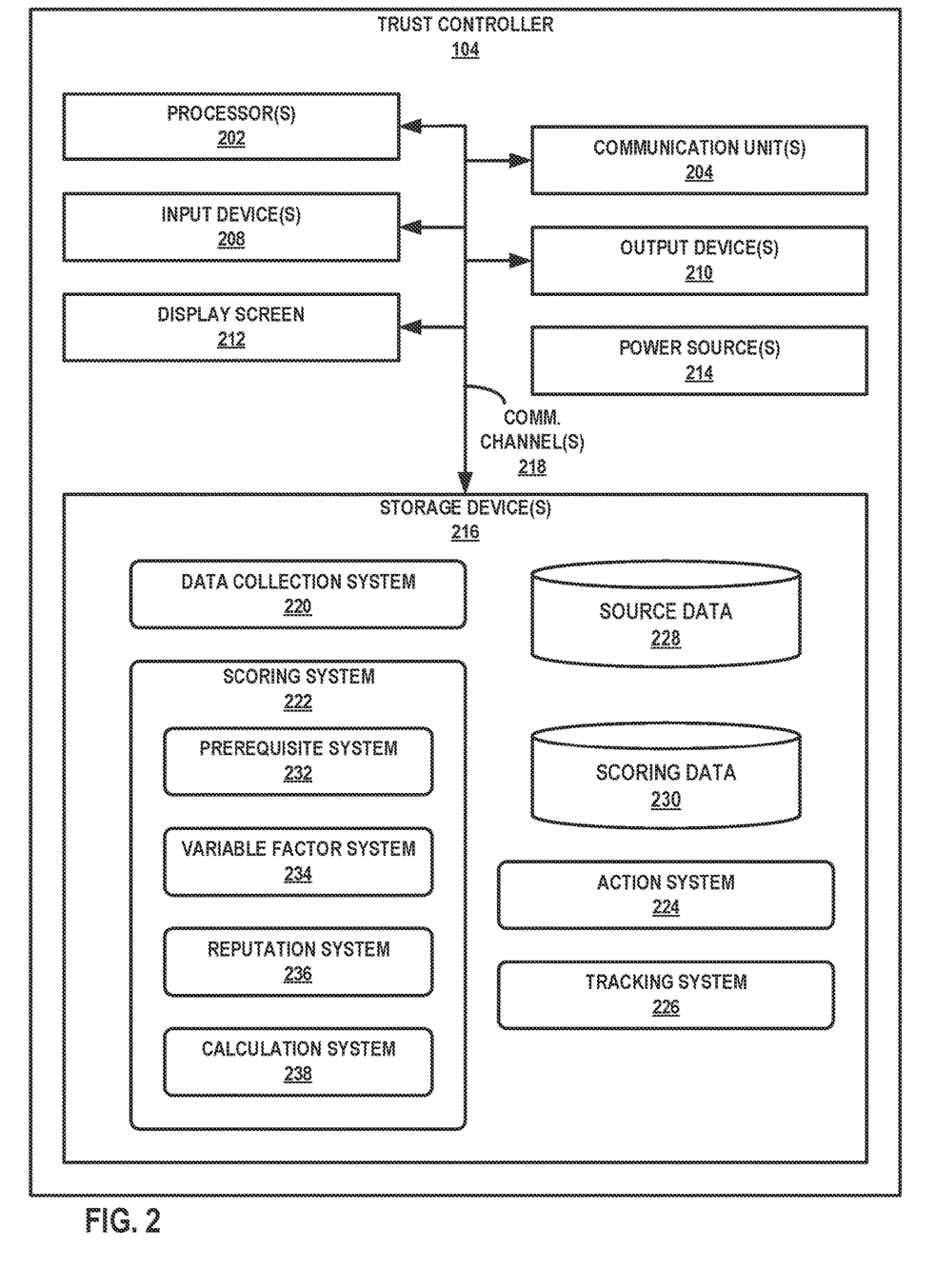
FIG. 2 is a block diagram illustrating example components of a trust controller in accordance with one or more techniques of this disclosure.

FIG. 2 is a block diagram illustrating example components of trust controller 104 in accordance with one or more techniques of this disclosure. FIG. 2 illustrates only one particular example of trust controller 104, and many other example configurations of trust controller 104 exist.

As shown in the example of FIG. 2, trust controller 104 includes one or more processors 202, one or more communication units 204, one or more input devices 208, one or more output devices 210, zero or more display screens 212, one or more power sources 214, one or more storage devices 216, and one or more communication channels 218. Trust controller 104 may include other components. For example, trust controller 104 may include physical buttons, microphones, speakers, communication ports, and so on. Communication channel(s) 218 may interconnect each of components 202, 204, 208, 210, 212, and 216 for inter-component communications (physically, communicatively, and/or operatively). In some examples, communication channel(s) 218 may include a system bus, a network connection, an inter-process communication data structure, or any other method for communicating data. Power source(s) 214 may provide electrical energy to components 202, 204, 208, 210, 212 and 216.

Storage device(s) 216 may store information required for use during operation of trust controller 104. In some examples, storage device(s) 216 have the primary purpose of being a short-term and not a long-term computer-readable storage medium. Storage device(s) 216 may include volatile memory and may therefore not retain stored contents if powered off. In some examples, storage device(s) 216 includes non-volatile memory that is configured for long-term storage of information and for retaining information after power on/off cycles. In some examples, processor(s)

202 of trust controller 104 may read and execute instructions stored by storage device(s) 216.

Trust controller 104 may include one or more input devices 208 that trust controller 104 uses to receive user input. Examples of user input include tactile, audio, and video user input. Input device(s) 208 may include presence-sensitive screens, touch-sensitive screens, mice, keyboards, voice responsive systems, microphones, motion sensors capable of detecting gestures, or other types of devices for detecting input from a human or machine.

Communication unit(s) 204 may enable trust controller 104 to send data to and receive data from one or more other computing devices (e.g., via a computer network, such as a local area network or the Internet). For instance, communication unit(s) 204 may be configured to receive data from network entities 102. In some examples, communication unit(s) 204 may include wireless transmitters and receivers that enable trust controller 104 to communicate wirelessly with the other computing devices. Examples of communication unit(s) 204 may include network interface cards, Ethernet cards, optical transceivers, radio frequency transceivers, or other types of devices that are able to send and receive information. Other examples of such communication units may include BLUETOOTH™, 3G, 4G, 5G, and WI-FI™ radios, Universal Serial Bus (USB) interfaces, etc. Additionally, trust controller 104 may use communication unit(s) 204 to communicate with one or more other devices.

Output device(s) 210 may generate output. Examples of output include tactile, audio, and video output. Output device(s) 210 may include presence-sensitive screens, sound cards, video graphics adapter cards, speakers, liquid crystal displays (LCD), light emitting diode (LED) displays, or other types of devices for generating output. Output device(s) 210 may include display screen 212. In some examples, output device(s) 210 may include virtual reality, augmented reality, or mixed reality display devices.

Processor(s) 202 may include processing circuitry configured to perform various actions. Processor(s) 202 may be configured to read instructions from storage device(s) 216 and may execute instructions stored by storage device(s) 216. Execution of the instructions by processor(s) 202 may configure or cause trust controller 104 to provide at least some of the functionality ascribed in this disclosure to trust controller 104 or components thereof (e.g., processor(s) 202). As shown in the example of FIG. 2, storage device(s) 216 include computer-readable instructions associated with a data collection system 220, a scoring system 222, an action system 224, and a tracking system 226. In the example of FIG. 2, storage device(s) 216 may also include source data 228 and scoring data 230. Furthermore, as shown in the example of FIG. 2, the computer-readable instructions associated with scoring system 222 may include computer-readable instructions associated with a prerequisite system 232, a variable factor system 234, a reputation system 236, and a calculation system 238. In other examples, storage device(s) 216 may include computer-readable instructions associated with other systems or modules.

Data collection system 220 is configured to collect data regarding network entities 102. For example, data collection system 220 may query log data of network entities as part of collecting the data regarding network entities 102. In some examples, data collection system 220 may be configured to collect configuration and performance data regarding the network entities. The configuration and performance data may include snapshots of configuration data, snapshots of alarm data, and logs. Source data 228 may include the data collected by data collection system 220.

Scoring system 222 may use source data 228 to determine trust scores for network entities 102. Scoring data 230 may include the trust scores determined by scoring system 222 for network entities 102. In the example of FIG. 2, prerequisite system 232 may determine prerequisite sub-scores for network entities 102. Variable factor system 234 may determine variable factor sub-scores for network entities 102. Reputation system 236 may determine reputation sub-scores for network entities 102. Calculation system 238 may use one or more of the prerequisite sub-score for a network entity, a variable factor sub-score for the network entity, or the reputation sub-score for the network entity to determine the trust score for the network entity.

As mentioned above, prerequisite system 232 may determine prerequisite sub-scores for network entities 102. That is, prerequisite system 232 may determine the trust score for a network entity based one or more prerequisites. Each of the prerequisites is a condition that must be satisfied for the trust score for a network entity not to have the minimum value. Prerequisite system 232 may evaluate the conditions to determine the prerequisite sub-score for a network entity. Prerequisite system 232 may store the prerequisite sub-scores for network entities 102 into scoring data 230. Example conditions may include whether the network entity is using a certified software release, whether the network entity is using a certified hardware release, and so on. Other prerequisites may include the network entity not using software versions that are known to be vulnerable, the network entity using only supported software or hardware versions, the network entity having the correct network time settings, the network entity having correct certificates for transport layer security (TLS) loaded, and so on. The conditions may be user-defined.

Furthermore, variable factor system 234 may determine variable factor sub-scores for network entities 102. Each of the one or more variable factors for a network entity corresponds to a current characteristic of the network entity. Variable factor system 234 may store the variable factor sub-scores for network entities 102 into scoring data 230. The characteristics may be user-defined. Examples of characteristics may include:

Use of only approved applications on the network entity.
Use of only signed applications on the network entity.
Whether a release version of the network entity is a known-good version.
A state or configuration of a network entity, e.g., if a recommended configuration is applied or not.
Whether a software release version of a software application of the network entity is within a given number of releases of a current version of the software application.
Rate limits for requests to be processed by a routing engine of a router.
Limits on rates of possible network management interactions per time period.
Password strength requirements.
Numbers and types of open network ports,
Whether cryptographic keys are renewed more frequently than a threshold time limit.

Variable factor system 234 may apply different weights to different characteristics to determine the variable factor sub-score for a network entity. Thus, specific characteristics may make greater contributions to the variable factor sub-score than other characteristics. Table 1, below, illustrates example contributions of specific choices (possible values) for specific characteristics of a network entity. As shown in the example of Table 1, software applications (apps) may be categorized into a plurality of classes (e.g., Class 1, Class 2, Class 3, etc.). The different classes of apps may correspond to different levels of risk. For instance, Class 1 apps may be limited to apps approved by a system vendor, signed applications, applications with security audits, etc., Class 2 apps may be limited to apps approved by a supplier, unsigned applications, applications with regular security updates, etc., Class 3 apps may be unapproved apps, and so on. In Table 1, the contribution column indicates a score that would be contributed if the corresponding choice in the "choices" column applies. In other examples, one or more choices may be associated with negative values, but the final variable factor sub-score may be limited to a minimum of 0 or other predefined minimum value. In Table 1, the "Sample Score" column provides an example of how a variable factor sub-score may be calculated for a specific network entity. Thus, in the example of Table 1, if the network entity used only Class 1 apps and has a software version that is within 3 releases of the most recent release of the software, but the software is not a known-good release, variable factor system 234 may determine the variable factor sub-score as 60 (i.e., 50+10).

TABLE 1

| | Characteristics | Contribution | Choices | Sample Score |
|---|---|---|---|---|
| Contributions within variable trust | Software (max 50%) | 50 | Class 1 apps only | 50 |
| | | 20 | Class 1 and Class 2 apps only | |
| | | 10 | Class 1, Class 2 and Class 3 apps | |
| | Is a known-good release | 40 | Yes | |
| | | 0 | No | 0 |
| | Software version <= last-3 | 10 | Yes | 10 |
| | | 0 | No | |
| | Total | | | 60 |

Reputation system 236 may determine reputation sub-scores for network entities 102. The reputation sub-score for a network entity may be based on one or more reputational factors for the network entity. Each of the reputational factors for the network entity is a function of specified historical events involving the network entity. The reputational factors for a network entity may be user-defined. The historical events may be defined to be those events that occur within a specific time period (e.g., 5 weeks, 10 weeks, 6 months, etc.). Reputation system 236 may store the reputation sub-scores for network entities 102 into scoring data 230. Example types of reputation factors may include:
  A number of temporal intervals (e.g., weeks, days, etc.) without a reset of the network entity.
  A number of temporal intervals (e.g., weeks, days, etc.) without a reboot of the network entity.
  A number of failed log-ins.
  Log-in frequency.
  Configuration frequency.
  A number of protocol timeouts or other runtime data Table 2, below, illustrates an example of how reputation system 236 may determine the reputation sub-score for a network entity. For instance, in Table 2, reputation system 236 may increase a reputation sub-score for the network entity by 5 for each month in which the network entity did not experience a reset. Furthermore, in Table 2, reputation system 236 may increase the reputation sub-score for the network entity by 15 for each month in which the network entity did not experience a reboot. Because the considered time period is 5 months, the maximum reputation sub-score, in this example, is 100.

TABLE 2

| Factor | Choices | Contribution |
|---|---|---|
| Relative weights for items within reputation | Reputation per period without reset | 5 |
| | Reputation per period without reboot | 15 |
| | Interval | Month |
| | Length of history considered | 5 |
| | Maximum | 100 |

Calculation system 238 may use one or more of a prerequisite sub-score for a network entity, a variable factor sub-score for the network entity, or a reputation sub-score for the network entity to determine the trust score for the network entity. When calculating a trust score for a network entity, calculation system 238 may determine that the trust score for the network entity indicates no trust if one or more of the prerequisite conditions are not satisfied (e.g., if the prerequisite sub-score has the minimum value (e.g., 0)). In some examples, calculation system 238 determines the trust score for a network entity as a sum of the variable factor sub-score and the reputation sub-score. In some examples, calculation system 238 determines the trust score for a network entity as a weighted sum of the variable factor sub-score and the reputation sub-score. For instance, calculation system 238 may apply a 60% weight to the variable factor sub-score and a 40% weight to the reputation sub-score. In some examples, the weights applied to the variable factor sub-score and the reputation sub-score are user-defined. Thus, because the weights applied to the variable factor sub-score and reputation sub-score are user-defined, the ultimate trust score may be dependent on a user's priorities and preferences. In some examples, calculation system 238 may multiply the resulting sum (or weighted sum) by the prerequisite sub-score to determine the trust score for the network entity. In some examples, rather than trust controller 104 calculating a prerequisite sub-score, calculation system 238 may simply set the trust score for a network entity to the minimum value (e.g., 0) if any of the prerequisite conditions are not satisfied. Calculation system 238 may store the trust scores for network entities 102 into scoring data 230.

In some example, scoring system 222 may aggregate the trust scores for two or more of network entities 102 to determine a trust score for a higher-order network entity. Example types of higher-order network entities may include networks, services, routes, and/or other collections of one or more network entities. Scoring system 222 may aggregate the trust scores in one of a variety of ways. For example, scoring system 222 may aggregate the trust scores for two or more of network entities 102 to determine a trust score for a higher-order network entity by taking a lowest trust score of the two or more network entities as the trust score for the higher-order network entity. In another example, scoring system 222 may aggregate the trust scores for two or more of network entities 102 to determine a trust score for a higher-order network entity as an average or sum of the trust scores for the two or more network entities.

Action system 224 may perform one or more actions based on the trust scores determined for network entities 102 by scoring system 222. For example, action system 224 may modify a traffic pattern of computer network 100 based on the trust score for the network entity. For instance, in this example, based on the trust score for the network entity, action system 224 may change the traffic pattern in computer network 100 to divert network traffic away from or direct the network traffic to the network entity. For instance, if the trust score for a network entity is below a specific threshold, action system 224 may change the traffic pattern in computer network 100 to divert network traffic away from the network entity. In some examples, if the trust score for a network entity is above a specific threshold, action system 224 may change the traffic pattern in computer network 100 to direct network traffic to the network entity. In another example, based on a trust score of a network entity being greater than a particular threshold, action system 224 may send instructions to one or more routers in computer network 100 that cause the routers to change routes in computer network 100 so that packets are not directed along routes that lead to or through the network entity.

In another example, action system 224 may determine that there is a conflict information between two sensors (e.g., in the context of an airplane, an angle of attack sensor and a nose pitch sensor). In this example, action system 224 may perform one or more actions based on the trust scores for the sensors (i.e., network entities) in response to determining such a conflict. For instance, action system 224 may generate a notice to an operator recommending use of information from the sensor with a greater trust score. In another example, action system 224 may disable the sensor with the lower trust score. In some examples, action system 224 may recommend a probe or obtain a combination of other sensor data to determine which of the two sensors is more likely to be generating accurate data. In an example where the network entities include multiple clock sources (e.g., Precision Time Protocol (PTP) clock sources), action system 224 may change a master clock source from a current clock source to a back-up clock source due to the back-up clock source having a greater trust score than the current clock source. In some examples, action system 224 may identify routes through network 100 based on trust scores for network entities in network 100. Thus, action system 224 may configure routers to route network traffic along routes that pass through network entities having high trust scores.

Figure 3:
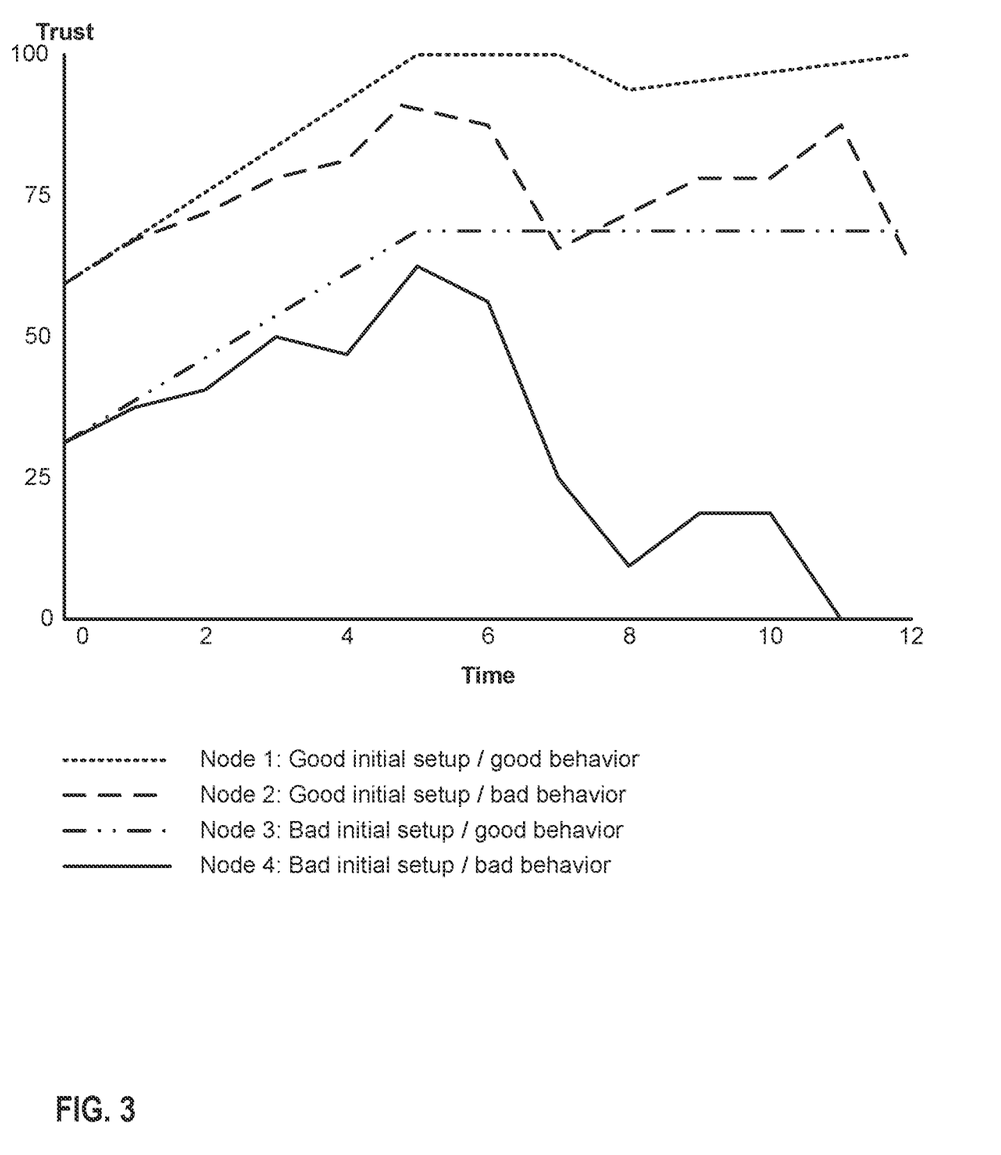
FIG. 3 is a chart showing example changes in trust scores over time, in accordance with one or more techniques of this disclosure.

In some examples, tracking module 226 may track changes in trust scores and/or sub-scores over time. For instance, FIG. 3 is a chart showing example changes in trust scores over time, in accordance with one or more techniques of this disclosure. Users may use information regarding changes in trust scores and/or sub-scores for various purposes. For example, a user may use historical information regarding trust scores for network entities to determine which network entities need attention (e.g., need to be upgraded, audited, reviewed, tested, etc.). In some examples, a user may use such historical information to identify network entities having consistently high trust scores and configure network 100 to utilize the identified network entities for high-priority tasks, such as for urgent communications during emergencies). In the example of FIG. 3, good initial setup means all pre-requisites are met and the variable and reputational factor result in a good initial score. Behavior corresponds to actions that change the trust score over time.

Figure 4:
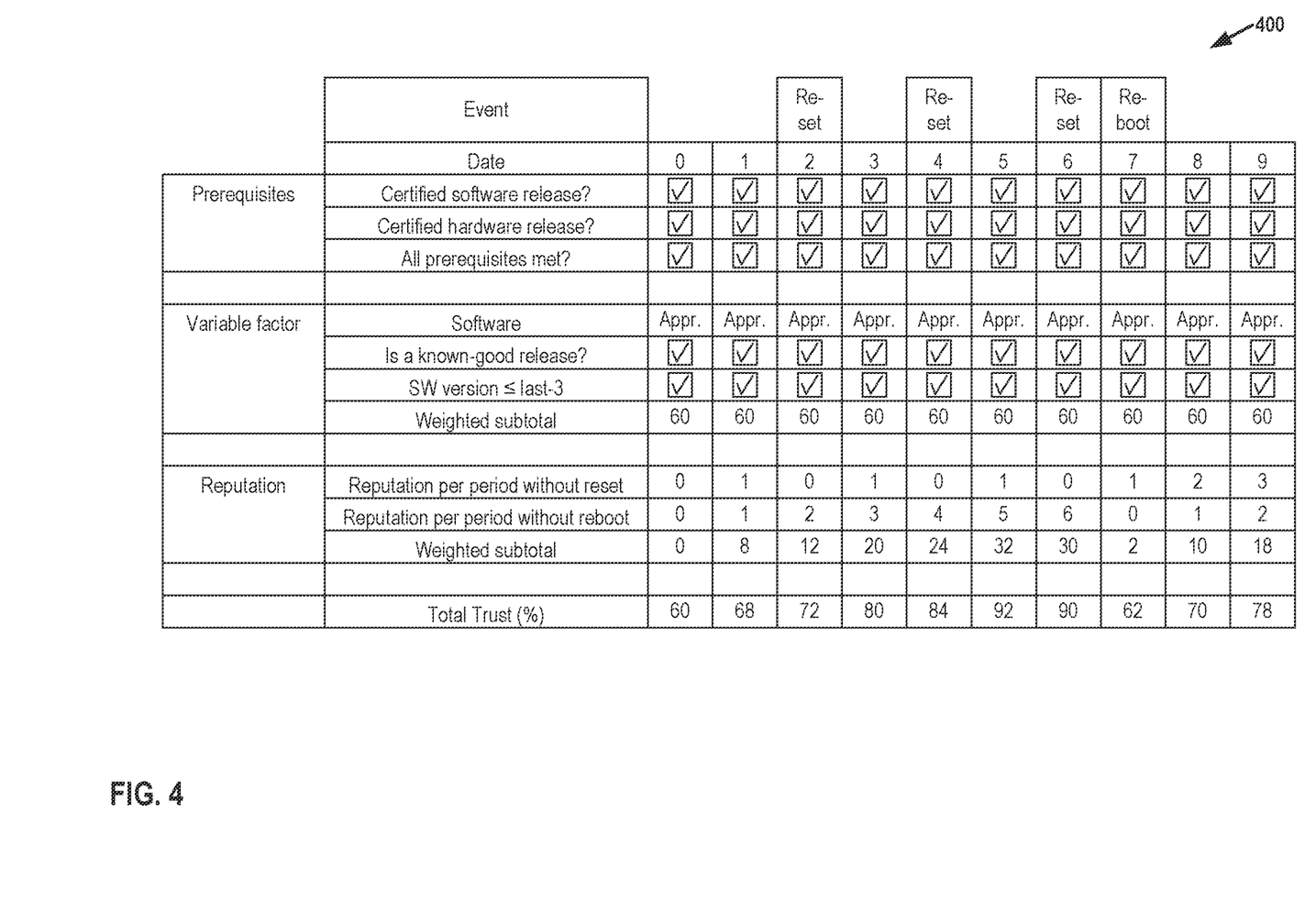
FIG. 4 is a table showing example changes in trust scores over time, in accordance with one or more techniques of this disclosure.

FIG. 4 is a table 400 showing example changes in trust scores over time, in accordance with one or more techniques of this disclosure. In the example of FIG. 4, the prerequisites include: whether the network entity uses a certified software release and whether the network entity uses a certified hardware release. Furthermore, in table 400, the variable factors include: a software factor (e.g., whether software of the network entity is limited to approved applications only; whether software of the network entity is limited to signed applications only; or whether software of the network entity includes unsigned applications). The reputation factors in table 400 include a number of temporal intervals (e.g., days, weeks, months, etc.) without a reset, and a number of temporal intervals without a restart. In the example of FIG. 4, resets happen at days 2, 4, and 6, and a reboot happens at day 7. In the example of FIG. 4, there are no changes in days 0 through 9 to the prerequisite or variable factor sub-scores. However, because of the passage of time and the various resets and reboot, the reputation sub-score changes (e.g., from 0 to 8 to 12 to 20, etc.). Hence, the trust score for the network entity also changes (e.g., from 60 to 68 to 72 to 80, etc.). Because of the changes in the trust score of the network entity, various actions may be performed with respect to the network entity over time. For instance, action system 224 may divert network traffic away from the network entity when the trust score for the network entity is less than 65. Thus, in the example of FIG. 4, network traffic may be directed to the network entity on days 1 through 6, 8 and 9 and diverted away from the network entity on days 0 and 7.

Figure 5:
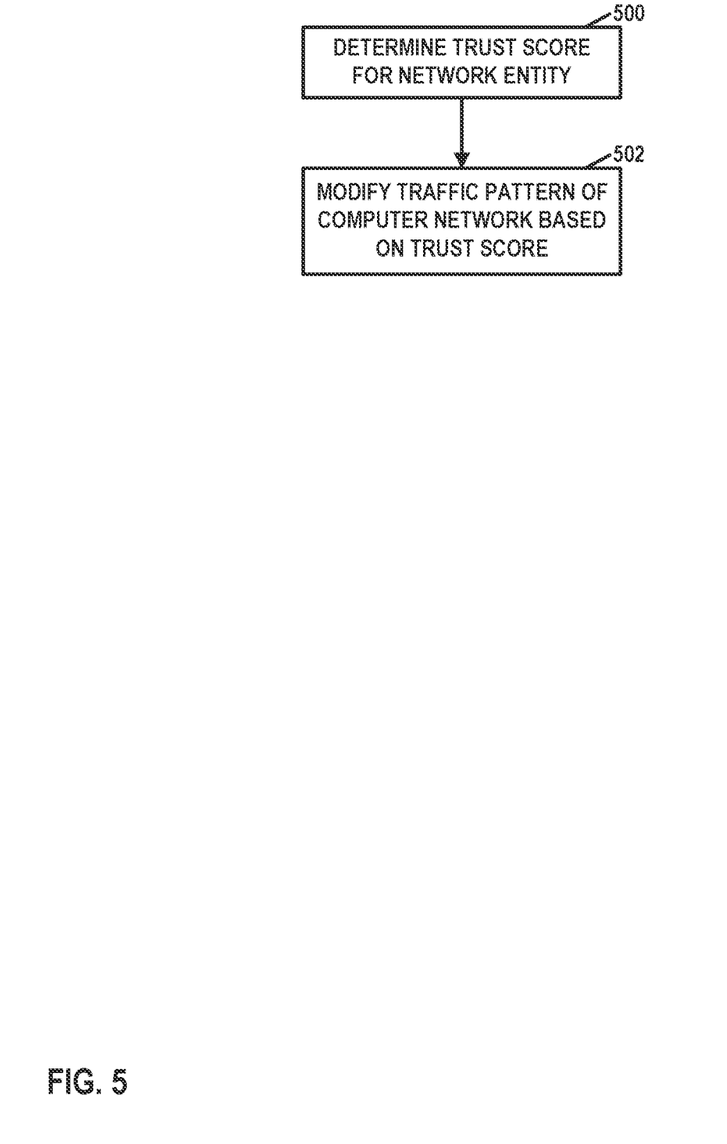
FIG. 5 is a flowchart illustrating an example operation in accordance with one or more techniques of this disclosure.

FIG. 5 is a flowchart illustrating an example operation in accordance with one or more techniques of this disclosure. In the example of FIG. 5, a computing system (e.g., trust controller 104) may determine a trust score for a network entity (e.g., one of network entities 102) in computer network 100 (500). The trust score for the network entity indicates a level of trust in the network entity. The computing system may determine the trust score in accordance with any of the examples provided elsewhere in this disclosure.

Furthermore, in the example of FIG. 5, the computing system may modify a traffic pattern of computer network 100 based on the trust score for the network entity (502). For example, the computing system may instruct one or more intermediate network devices (e.g., routers) to change routes in computer network 100 to avoid sending traffic to the network entity. In another example, the computing system may instruct a firewall device to block traffic from the network entity. As described elsewhere in this disclosure, the computing system may perform other actions based on the trust scores for network entities.

Figure 6:
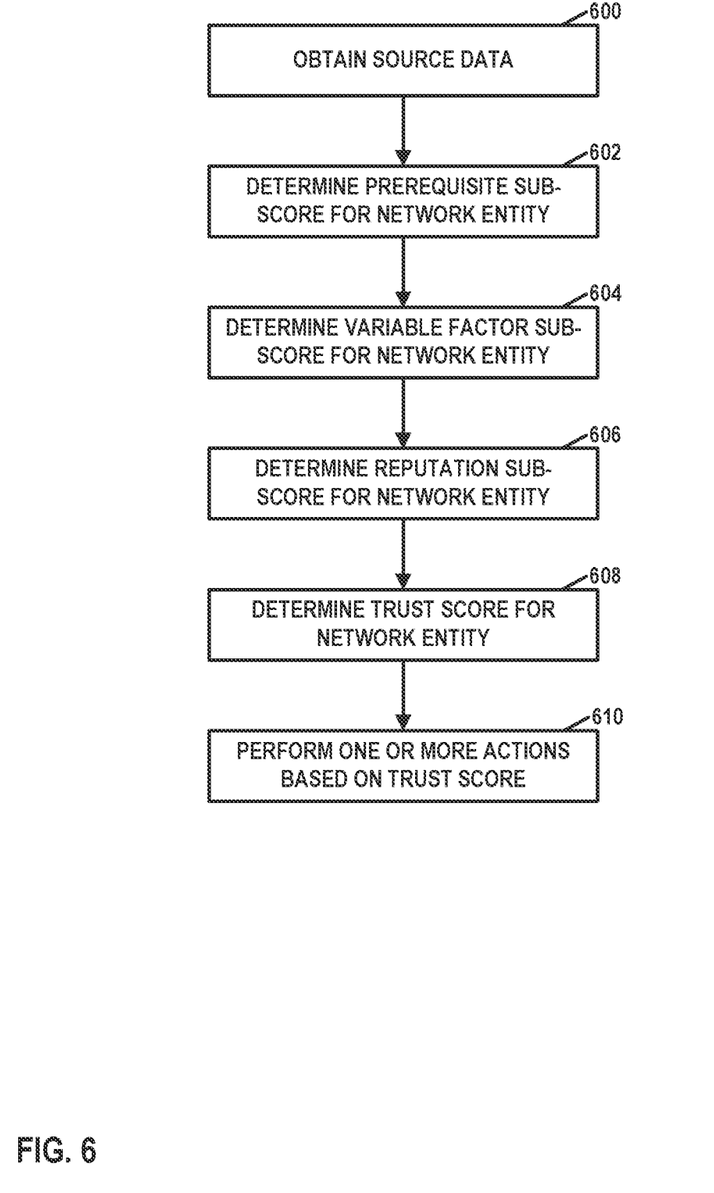
FIG. 6 is a flowchart illustrating an example operation to determine a trust score and perform an action based on the trust score in accordance with one or more techniques of this disclosure.

FIG. 6 is a flowchart illustrating an example operation to determine a trust score and perform an action based on the trust score in accordance with one or more techniques of this disclosure. In the example of FIG. 6, scoring system 222 may obtain source data 228 (600). Scoring system 222 may obtain source data 228 from a variety of sources. For instance, scoring system 222 may obtain the source data directly from network entities (e.g., devices, apps, etc.), from intermediary devices that control network entities (e.g., Element Management System (EMS) controllers, Software-Defined Networking (SDN), etc., offline records, and so on. In some examples, trust controller 104 (e.g., scoring system 222 of trust controller 104) may perform the operation to determine the trust score for a network entity in response to receiving a request from a user or application. In some examples, trust controller 104 may perform the operation to determine the trust score for a network entity on a periodic basis (e.g., once per temporal interval, e.g., once per day). In some examples, trust controller 104 may perform the operation to determine the trust score for a network entity in response to a manual trigger, such as a user input. In some examples, trust controller 104 may perform the operation to determine the trust score for a network entity in response to specific events, such as a drop in trust scores for one or more other network entities.

Furthermore, in the example of FIG. 6, prerequisite system 232 of scoring system 222 may determine a prerequisite sub-score for the network entity (602). Each of the one or more prerequisites is condition that must be satisfied for the trust score for the network entity not to have the minimum value. In some examples, to determine the prerequisite sub-score for the network entity, prerequisite system 232 may evaluate one or more prerequisites with respect to the network entity. Each of the prerequisites may be a Boolean condition (i.e., a statement that evaluates to true or false). Accordingly, the prerequisite sub-score itself may be a Boolean value. Based on source data 228, prerequisite system 232 may determine whether each of the prerequisites evaluates to true or false. In this example, if any of the prerequisites evaluates to false, prerequisite system 232 may set the pre-requisite sub-score for the network entity to false (e.g. 0). In other words, if any of the prerequisites evaluates to false, prerequisite system 232 may define the overall prerequisites as not being met.

Additionally, variable factor system 234 of scoring system 222 may determine a variable factor sub-score for the network entity (604). Each of the one or more variable factors for the network entity corresponds to a current characteristic of the network entity. Variable factor system 234 may determine the variable factor sub-score may use source data 229 to determine scores for one or more characteristics of the network entity.

Reputation system 236 of scoring system 222 may determine a reputation sub-score for the network entity (606). Each of the reputational factors for the network entity is a function of specified historical events involving the network entity. For example, reputation system 236 may determine the reputation sub-score, e.g., as described with respect to Table 2 or elsewhere in this disclosure.

Calculation system 238 of scoring system 222 may then determine a trust score for the network entity based on the prerequisite sub-score for the network entity, the reputation sub-score for the network entity, and the trust score for the network entity (608). For example, calculation system 238 may set the trust score for the network entity to the minimum trust score if the prerequisite sub-score for the network entity indicates that the prerequisites have not been met. In this example, if the prerequisite sub-score for the network entity indicates that the prerequisites have not been met, calculation system 238 may determine the trust score for the network entity as a sum (or weighted sum) of the variable factor sub-score for the network entity and the reputation sub-score for the network entity. In some examples, calculation system 238 may determine the trust score for the network entity as a percentage of the highest possible trust score.

Action system 224 may perform one or more actions based on the trust score (610). For example, based on the trust score for the network entity being below a specific threshold, action system 224 may divert network traffic away from or direct the network traffic to the network entity. For instance, in this example, action system 224 may send messages to one or more devices in network 100 that instruct the devices to direct network traffic along routes that do not depend upon the network entity. In some examples, including examples in which action system 224 does not modify traffic patterns of the computer network based on trust scores, action system 224 may modify, by the computing system, a testing pattern for the network entity based on the trust score for the network entity. The testing pattern may correspond to a pattern (e.g., a temporal pattern, event-based pattern, etc.) that is used (e.g., by trust controller 104 or another system) to perform testing on a network entity. Example types of testing may include network probing, auditing, data logging, and so on. Modifying the testing pattern may include increasing or decreasing the intensity of the testing pattern.

The following is a non-limiting list of aspects that are consistent with one or more techniques of this disclosure.

Aspect 1. A method comprising: determining, by a computing system, a trust score for a network entity in a computer network, the trust score for the network entity indicating a level of trust in the network entity; and modifying, by the computing system, a traffic pattern of the computer network based on the trust score for the network entity.

Aspect 2. The method of aspect 1, wherein modifying the traffic pattern comprises changing, by the computing system, based on the trust score for the network entity, the traffic pattern to divert network traffic away from or direct the network traffic to the network entity.

Aspect 3. The method of aspects 1 or 2, wherein determining the trust score for the network entity comprises: determining, by the computing system, the trust score for the network entity based on one or more prerequisites, wherein each of the one or more prerequisites is condition that must be satisfied for the trust score for the network entity not to be a minimum value.

Aspect 4. The method of aspect 3, wherein the prerequisites include whether the network entity uses a certified software release and whether the network entity uses a certified hardware release.

Aspect 5. The method of any of aspects 1-4, wherein determining the trust score for the network entity comprises: determining, by the computing system, the trust score for the network entity based on one or more variable factors for the network entity, wherein each of the one or more variable factors for the network entity corresponds to a current characteristic of the network entity.

Aspect 6. The method of aspect 5, wherein the variable factors include whether software of the network entity is limited to approved applications only, whether the software of the network entity is limited to a first class of applications, or whether the software of the network entity includes a second class of applications.

Aspect 7. The method of any of aspects 1-6, wherein determining the trust score for the network entity comprises: determining, by the computing system, the trust score for the network entity based on one or more reputational factors for the network entity, wherein each of the reputational factors for the network entity is a function of specified historical events involving the network entity.

Aspect 8. The method of aspect 7, wherein the reputational factors include one or more of: a number of time intervals without a reset of the network entity, or a number of time intervals without a reboot of the network entity.

Aspect 9. The method of any of aspects 1-8, wherein determining the trust score for the network entity comprises: determining, by the computing system, a first sub-score based on one or more prerequisites, wherein each of the one or more prerequisites is condition that must be satisfied for the trust score for the network entity not to be a minimum value; determining, by the computing system, a second sub-score based on one or more variable factors of the network entity, wherein each of the one or more variable factors corresponds to a current characteristic of the network entity; determining, by the computing system, a third sub-score based on one or more reputational factors of the network entity, wherein each of the reputational factors is a function of specified historical events involving the network entity; and determining, by the computing system, the trust score for the network entity based on the first sub-score, the second sub-score, and the third sub-score.

Aspect 10. The method of any of aspects 1-9, wherein the network entity is a higher-order network entity that comprises a plurality of network entities, and determining the trust score for the higher-order network entity comprises aggregating trust scores for the plurality of network entities to determine the trust score for the higher-order network entity.

Aspect 11. The method of any of aspects 1-10, wherein the method further comprises modifying, by the computing system, a testing pattern for the network entity based on the trust score for the network entity.

Aspect 12. A computing system comprising: one or more processors comprising processing circuitry configured to: determining, by a computing system, a trust score for a network entity in a computer network, the trust score for the network entity indicating a level of trust in the network entity; and modifying, by the computing system, a traffic pattern of the computer network based on the trust score for the network entity; and one or more storage devices configured to store the trust score for the network entity.

Aspect 13. The computing system of aspect 12, wherein the one or more processors are configured such that, as part of modifying the traffic pattern, the one or more processors change, based on the trust score for the network entity, the traffic pattern to divert network traffic away from the network entity.

Aspect 14. The computing system of aspects 12 or 13, wherein the one or more processors are configured such that, as part of determining the trust score for the network entity, the one or more processors: determine the trust score for the network entity based on one or more prerequisites, wherein each of the one or more prerequisites is condition that must be satisfied for the trust score for the network entity not to be a minimum value.

Aspect 15. The computing system of aspect 14, wherein the prerequisites include whether the network entity uses a certified software release and whether the network entity uses a certified hardware release.

Aspect 16. The computing system of any of aspects 12-15, wherein the one or more processors are configured such that, as part of determining the trust score for the network entity, the one or more processors: determine the trust score for the network entity based on one or more variable factors for the network entity, wherein each of the one or more variable factors for the network entity corresponds to a current characteristic of the network entity.

Aspect 17. The computing system of aspect 16, wherein the variable factors include whether software of the network entity is limited to approved applications only, whether the software of the network entity is limited to signed applications only, or whether the software of the network entity includes unsigned applications.

Aspect 18. The computing system of any of aspects 12-17, wherein the one or more processors are configured such that, as part of determining the trust score for the network entity, the one or more processors: determine the trust score for the network entity based on one or more reputational factors for the network entity, wherein each of the reputational factors for the network entity is a function of specified historical events involving the network entity.

Aspect 19. The computing system of aspect 18, wherein the reputational factors include one or more of: a number of time intervals without a reset of the network entity, or a number of time intervals without a reboot of the network entity.

Aspect 20. The computing system of any of aspects 12-19, wherein the one or more processors are configured such that, as part of determining the trust score for the network entity, the one or more processors: determine a first sub-score based on one or more prerequisites, wherein each of the one or more prerequisites is condition that must be satisfied for the trust score for the network entity not to be a minimum value; determine a second sub-score based on one or more variable factors of the network entity, wherein each of the one or more variable factors corresponds to a current characteristic of the network entity; determine a third sub-score based on one or more reputational factors of the network entity, wherein each of the reputational factors is a function of specified historical events involving the network entity; and determine the trust score for the network entity based on the first sub-score, the second sub-score, and the third sub-score.

Aspect 21. The computing system of any of aspects 12-20, wherein the network entity is a higher-order network entity that comprises a plurality of network entities, and the one or more processors are configured to aggregate trust scores for the plurality of network entities to determine the trust score for the higher-order network entity.

Aspect 22. The computing system of any of aspects 12-20, wherein the one or more processors are further configured to modify a testing pattern for the network entity based on the trust score for the network entity.

Aspect 23. A computer-readable storage medium comprising instructions that, when executed, cause one or more programmable processors to: determine a trust score for a network entity in a computer network, the trust score for the network entity indicating a level of trust in the network entity; and modify a traffic pattern of the computer network based on the trust score for the network entity.

Aspect 24. The computer-readable storage medium of aspect 23, wherein the instructions, when executed, cause the one or more programmable processors to perform the methods of any of aspects 1-11.

Although this disclosure is primarily described with respect to network entities, the techniques of this disclosure may be applicable with respect to other concepts, such as social media profiles, gaming profiles, real world service providers, and so on.

In this disclosure, terms such as "first," "second," "third," and so on, are used nominally rather than ordinally, and as such, are not necessarily indicators of positions within an order, but rather may be used to distinguish different instances of the same thing, unless otherwise indicated. Examples provided in this disclosure may be used together, separately, or in various combinations. Furthermore, with respect to examples that involve personal data regarding a user, it may be required that such personal data only be used with the permission of the user.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media may include RAM, ROM, EEPROM, CD-ROM or other optical disk storage, magnetic disk storage, or other magnetic storage devices, flash memory, cache memory, or any other medium that can be used to store desired program code in the form of instructions or store data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, an integrated circuit (IC) or a set of ICs (e.g., a chip set). Various components, modules, software systems, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

What is claimed is:

1. A method comprising:
    determining, by a computing system, based on one or more prerequisites, a trust score for a network entity in a computer network, the trust score for the network entity indicating a level of trust in the network entity, wherein each of the one or more prerequisites is a condition that must be satisfied for the trust score for the network entity not to be a minimum value; and
    modifying, by the computing system, a traffic pattern of the computer network based on the trust score for the network entity.

2. The method of claim 1, wherein modifying the traffic pattern comprises changing, by the computing system, based on the trust score for the network entity, the traffic pattern to divert network traffic away from or direct the network traffic to the network entity.

3. The method of claim 1, wherein the prerequisites include whether the network entity uses a certified software release and whether the network entity uses a certified hardware release.

4. The method of claim 1, wherein determining the trust score for the network entity comprises:
    determining, by the computing system, the trust score for the network entity based on one or more variable factors for the network entity, wherein each of the one or more variable factors for the network entity corresponds to a current characteristic of the network entity.

5. The method of claim 4, wherein the variable factors include whether software of the network entity is limited to approved applications only, whether the software of the network entity is limited to a first class of applications, or whether the software of the network entity includes a second class of applications.

6. The method of claim 1, wherein determining the trust score for the network entity comprises:
    determining, by the computing system, the trust score for the network entity based on one or more reputational factors for the network entity, wherein each of the reputational factors for the network entity is a function of specified historical events involving the network entity.

7. The method of claim 6, wherein the reputational factors include one or more of: a number of time intervals without a reset of the network entity, or a number of time intervals without a reboot of the network entity.

8. The method of claim 1, wherein determining the trust score for the network entity comprises:
    determining, by the computing system, a first sub-score based on the one or more prerequisites;
    determining, by the computing system, a second sub-score based on one or more variable factors of the network entity, wherein each of the one or more variable factors corresponds to a current characteristic of the network entity;

determining, by the computing system, a third sub-score based on one or more reputational factors of the network entity, wherein each of the reputational factors is a function of specified historical events involving the network entity; and determining, by the computing system, the trust score for the network entity based on the first sub-score, the second sub-score, and the third sub-score.

9. The method of claim 1, wherein the network entity is a higher-order network entity that comprises a plurality of network entities, and determining the trust score for the higher-order network entity comprises aggregating trust scores for the plurality of network entities to determine the trust score for the higher-order network entity.

10. The method of claim 1, wherein the method further comprises modifying, by the computing system, a testing pattern for the network entity based on the trust score for the network entity.

11. A computing system comprising:
one or more processors comprising processing circuitry configured to:
determine, based on one or more prerequisites, a trust score for a network entity in a computer network, the trust score for the network entity indicating a level of trust in the network entity, wherein each of the one or more prerequisites is a condition that must be satisfied for the trust score for the network entity not to be a minimum value; and
modify a traffic pattern of the computer network based on the trust score for the network entity; and
one or more storage devices configured to store the trust score for the network entity.

12. The computing system of claim 11, wherein the one or more processors are configured such that, as part of modifying the traffic pattern, the one or more processors change, based on the trust score for the network entity, the traffic pattern to divert network traffic away from the network entity.

13. The computing system of claim 11, wherein the prerequisites include whether the network entity uses a certified software release and whether the network entity uses a certified hardware release.

14. The computing system of claim 11, wherein the one or more processors are configured such that, as part of determining the trust score for the network entity, the one or more processors:
determine the trust score for the network entity based on one or more variable factors for the network entity, wherein each of the one or more variable factors for the network entity corresponds to a current characteristic of the network entity.

15. The computing system of claim 11, wherein the one or more processors are configured such that, as part of determining the trust score for the network entity, the one or more processors:
determine the trust score for the network entity based on one or more reputational factors for the network entity, wherein each of the reputational factors for the network entity is a function of specified historical events involving the network entity.

16. The computing system of claim 11, wherein the one or more processors are configured such that, as part of determining the trust score for the network entity, the one or more processors:

determine a first sub-score based on the one or more prerequisites;

determine a second sub-score based on one or more variable factors of the network entity, wherein each of the one or more variable factors corresponds to a current characteristic of the network entity;

determine a third sub-score based on one or more reputational factors of the network entity, wherein each of the reputational factors is a function of specified historical events involving the network entity; and determine the trust score for the network entity based on the first sub-score, the second sub-score, and the third sub-score.

17. The computing system of claim 11, wherein the network entity is a higher-order network entity that comprises a plurality of network entities, and the one or more processors are configured to aggregate trust scores for the plurality of network entities to determine the trust score for the higher-order network entity.

18. A non-transitory computer-readable storage medium comprising instructions that, when executed, cause one or more programmable processors to:
determine, based on one or more prerequisites, a trust score for a network entity in a computer network, the trust score for the network entity indicating a level of trust in the network entity, wherein each of the one or more prerequisites is a condition that must be satisfied for the trust score for the network entity not to be a minimum value; and
modify a traffic pattern of the computer network based on the trust score for the network entity.

19. A method comprising:
determining, by a computing system, a trust score for a network entity in a computer network, the trust score for the network entity indicating a level of trust in the network entity, wherein determining the trust score for the network entity comprises determining the trust score for the network entity based on one or more reputational factors for the network entity, wherein each of the reputational factors for the network entity is a function of specified historical events involving the network entity, and the reputational factors include one or more of: a number of time intervals without a reset of the network entity, or a number of time intervals without a reboot of the network entity; and
modifying, by the computing system, a traffic pattern of the computer network based on the trust score for the network entity.

20. A method comprising:
determining, by a computing system, a trust score for a network entity in a computer network, the trust score for the network entity indicating a level of trust in the network entity, wherein the network entity is a higher-order network entity that comprises a plurality of network entities, and determining the trust score for the higher-order network entity comprises aggregating trust scores for the plurality of network entities to determine the trust score for the higher-order network entity; and
modifying, by the computing system, a traffic pattern of the computer network based on the trust score for the network entity.

21. A computing system comprising:
one or more processors comprising processing circuitry configured to:
determine a trust score for a network entity in a computer network, the trust score for the network entity indicating a level of trust in the network entity, wherein the network entity is a higher-order network entity that comprises a plurality of network entities, and the one or more processors are configured to aggregate trust scores for the plurality of network entities to determine the trust score for the higher-order network entity; and modify a traffic pattern of the computer network based on the trust score for the network entity; and one or more storage devices configured to store the trust score for the network entity.

\* \* \* \* \*